United States Patent [19]

Manor et al.

[11] 4,364,914

[45] Dec. 21, 1982

[54] PROCESS FOR THE MANUFACTURE OF POTASSIUM NITRATE WITH CO-PRODUCTION OF HYDROCHLORIC ACID

[75] Inventors: Shalom Manor, Haifa; Moshe Bar-Guri, Kfar Hasidim; Amiad Alexandron; Moshe Kreisel, both of Haifa, all of Israel

[73] Assignee: Haifa Chemicals Ltd., Haifa, Israel

[21] Appl. No.: 249,677

[22] Filed: Mar. 31, 1981

[30] Foreign Application Priority Data

Apr. 30, 1980 [IL] Israel ............................................ 59952

[51] Int. Cl.$^3$ ............................................... C01D 9/04
[52] U.S. Cl. .................................... 423/399; 423/398; 423/390
[58] Field of Search ........................ 423/390, 398, 399; 23/299

[56] References Cited

U.S. PATENT DOCUMENTS 2,902,341  9/1959  Baniel et al. ............................ 423/399

FOREIGN PATENT DOCUMENTS 1585473  1/1970  France ................................ 423/390

OTHER PUBLICATIONS

Marcus et al., "Ion Exchange & Solv. Ext. of Metal Complexes", Wiley-Intersci., NY 1970, pp. 590-597, 600-601, 605-607.

Primary Examiner—G. Peters
Attorney, Agent, or Firm—Schwartz, Jeffery, Schwaab, Mack, Blumenthal & Koch

[57] ABSTRACT

The present invention relates to a process for the manufacture of potassium nitrate with co-production of relatively concentrated aqueous solution of hydrochloric acid.

According to the invention, potassium chloride and nitric acid are reacted in the medium of an organic solvent selected from butanols and pentanols. The solution obtained after the separation of the resulting potassium nitrate, containing hydrochloric acid together with nitric acid and said organic solvent, is subsequently washed thus resulting an aqueous solution of hydrochloric acid which contains nitric acid. The nitric acid is extracted by an organic solvent selected from organic esters of phosphoric acid, ketones having five to ten carbon atoms and straight or cyclic polyethers having molecular weight in the range of 100 to 1000 and polyalkylene glycols which are slightly miscible in water and having molecular weight in the range of 1000 to 3000, or mixtures thereof, preferably in the presence of an organic diluent. The remaining brine consists of a substantially nitrate-free hydrochloric acid. The $NO_3^-$-loaded solvent is washed, the nitric acid as well as the organic solvent being respectively recycled in the process.

The process saves appreciable amounts of nitric acid, co-producing hydrochloric acid which can be utilized without any further concentrating step.

9 Claims, 4 Drawing Figures

PROCESS FOR THE MANUFACTURE OF POTASSIUM NITRATE WITH CO-PRODUCTION OF HYDROCHLORIC ACID

The present invention relates to the manufacture of potassium nitrate by the reaction of potassium chloride with nitric acid. More specifically the invention relates to the manufacture of potassium nitrate, wherein aqueous solutions of hydrochloric acid, which are substantially free of nitric acid are obtained as by-product.

Potassium nitrate is now fully recognized as one of the most important potassium fertilizers which contains 46.58% potash (expressed as $K_2O$) and 13.6% nitrogen (N). As a chemical compound it is neutral and its nitrogen-potassium oxide ($N:K_2O$) ratio of approximately 1:3.4 is fixed. Pure potassium nitrate is only slightly hygroscopic and less subject to caking than pure potassium chloride. Potassium nitrate is also less hygroscopic than other nitrate salts used as fertilizer.

Most of the potassium nitrate made until 1967 was obtained from reacting sodium nitrate with potassium chloride. The potassium nitrate thus manufactured was aimed principally at industrial applications because of its high cost. In 1968 a plant was erected at Haifa Chemicals Ltd. to produce potassium nitrate from potassium chloride and nitric acid, using solvent extraction technique in accordance with Israeli Pat. Nos. 9539 and 9660 and their corresponding U.S. Pat. Nos. 2,902.341 and 2,894.813. According to these patents the process involves the reaction:

$$KCl + HNO_3 \rightarrow KNO_3 + HCl$$

The essence of the process lies in the removal of HCl from the reaction mixture, thus driving the equilibrium to the right. This is accomplished by contacting the reaction mixture with an organic solvent, partially miscible with water, into which the HCl formed is extracted. The reactants, nitric acid and potassium chloride are fed to the reaction, substantially in stoichiometric proportionms. In the presence of a solvent the transformation of KCl to $KNO_3$ is complete and takes place virtually in the solid phase. For processing convenience, however the presence of a certain quantity of aqueous phase is preferable, this aqueous phase being a brine-containing acid at a level dependent on the reaction temperature and the acidity of the reaction solvent, which is saturated with respect to KCl and $KNO_3$. The water balance over the entire process is so adjusted that the quantity of aqueous phase (brine) remains constant. The preferred reaction temperature is in the range of 0° to 10° C., said patents mentioning that the reaction between the KCl and $HNO_3$ and the extraction are carried out at temperature not exceeding 63° C. The conversion of KCl into $KNO_3$ is carried out in a series of stirred reactors, the reactants, recycle solvent and recycle brine being fed to the first vessel. The three-phase reaction mixture consisting of (1) solid potassium nitrate; (2) hydrochloric acid and nitric acid-charged solvent; and (3) the brine are fed to a decanting vessel. The solvent phase is separated and is passed to the liquid-liquid contacting system to remove as by-product hydrochloric acid in the form of a very dilute aqueous solution having a concentration of between 5 to 8% by wt. In order to become a saleable product, this hydrochloric acid requires substantial concentration is a multiple effect evaporator, but this means additional costs and energy requirement, which are of course a disadvantage of the process.

The organic solvents used in the above process are specific for acids, i.e. salts are not extracted, but they suffer from the fact that they are not selective for hydrochloric acid so that some nitric acid is co-extracted. This is another disadvantage of the process which requires an additional treatment of the solution for example, treatment with formaldehyde to eliminate its nitrate content. In addition to the fact that this additional treatment consists a nuisance for the entire process, it also requires reagents and thus affects to a certain extent the costs of production. The organic solvents claimed in the above mentioned Israeli Patents are selected from the group consisting of aliphatic monohydric alcohols having four to five carbon atoms.

The process of potassium nitrate manufacture as utilized at Haifa Chemicals plant is based on the conversion of potassium chloride into potassium nitrate utilizing amyl alcohol as the organic solvent.

Although the process operates smoothly being also quite attractive from an economic point of view, it suffers from two main disadvantages: (1) The low concentration of the hydrochloric acid by-product obtained and (2) The excess of reaction brine accumulating in the reaction systems contains about 6% nitric acid and can be eliminated by an additional treatment.

In our co-pending patent application Ser. No. 249,355, filed Mar. 31, 1981 a process was disclosed wherein an aqueous reaction medium without organic solvent was suggested, for carrying out the reaction between potassium chloride and nitric acid wherein a complete recovery of the nitrate ion is achieved from the spent brine. The $NO_3^-$-free brine can be substantially processed for obtaining relatively high concentrated solutions of hydrochloric acid. Although the process might be quite attractive from an economical point of view, it has as main disadvantage the requirement of relatively low temperatures for said reaction, the preferred range of $-20°$ C. to 0° C. being mentioned in order to obtain a substantially pure potassium nitrate.

In the last twenty years several theoretical papers appeared in the literature on the preferential extraction of low ionization acids such as nitric acid, over highly ionized acids such as hydrochloric acid. Thus, for instance, in determination of extractions carried out for nitric acid and hydrochloric acid separately (Baldwin et al., J. Phys. Chem. 63, 118, 1959) in a system of tributyl phosphate and water, it was found that the largest distribution coefficient measured between an organic and aqueous phase is for $HNO_3$ followed by HCl. Two different mechanisms were proposed:

(a) $HNO_3$ displaces water from tributyl phosphate and is extracted due to the formation of a specific salt complex, and (b) HCl adds water to tributyl phosphate and its extraction is usually difficult and strongly influenced by hydration phenomena.

Another review (Irving et al., J. Inorg. Nucl. Chem., 10, 306, 1959) compares the extraction of HCl versus $HNO_3$ with tributyl phosphate and kerosene mixtures from aqueous solutions. The coefficients distribution reported for, $HNO_3$ and HCl separately, with various mixtures of tributyl phosphate: kerosene, show that in all cases, $HNO_3$ is extracted better than HCl. The above references on the preferential extraction of one acid over another which might have some importance from a theoretical point of view, should be considered as part of the general background but without any teaching on its possible use in a complex technological system such as prevails in the manufacture of potassium nitrate. As postulated in the above references the effective extractions of a strong acid, will depend upon the strong interaction which exists between said acid and the solvent molecules. Therefore one cannot predict the extractability of one of these acids in a system which already contains an organic solvent such as amyl alcohol or butanol, as utilized in according to the above mentioned U.S. Pat. Nos. 2,902.341 and 2,894.813.

It is an object of the present invention to provide a simple process for the manufacture of potassium nitrate from potassium chloride and nitric acid, the reaction between said reagents being carried out in the presence of an organic solvent selected from butanols and pentanols, the hydrochloric acid co-produced being substantially nitrate-free. It is another object of the present invention to provide a simple process for the manufacture of potassium nitrate from potassium chloride and nitric acid, said process resulting in relatively concentrated aqueous solutions of hydrochloric acid as by-product.

Thus the invention consists of a process for the manufacture of potassium nitrate by reacting potassium chloride and nitric acid which comprises the performance of said reaction in the medium of an organic solvent, selected from butanols and pentanols, the ratio between said reactants being in the range of 0.9 mole of $HNO_3$ per one mole of KCl up to 3 moles of $HNO_3$ to one mole of KCl, separating the potassium nitrate, while the liquid phase removed consists of an aqueous solution and organic solvent extract containing hydrochloric acid and nitric acid, washing the solvent extract in obtaining a dilute aqueous solution of hydrochloric acid containing nitric acid, the improvement consisting in that said aqueous solution of hydrochloric acid containing nitric acid is contacted with an organic solvent selected from organic esters of phosphoric acid, ketones having between five and ten carbon atoms and straight and cyclic polyethers or polyalkylene glycols MW (1000–3000), or mixtures thereof, preferably in the presence of an organic diluent, whereby said organic solvent extracts selectively the nitric acid leaving a relatively concentrated aqueous solution of hydrochloric acid substantially nitrate-free, while the $NO_3^-$ loaded solvent extract is washed by water, the recovered nitric acid and washed solvent being recycled to the process.

The inventors of the present invention have carried out an exhaustive work research to solve the problem of the nitric acid presence in the hydrochloric acid. In addition to the fact that appreciable amounts of nitric acid were present therein, which means loss of raw material, it was mandatory to eliminate said nitric acid by chemical reagents. Thus for instance at Haifa Chemicals potassium nitrate plant, said nitric acid is destroyed by reacting with excess of formaldehyde (excess of about 50% above the stoichiometric amount). The excess of formaldehyde should be eliminated by distilling out since otherwise it might induce undesirable reactions with the organic solvent from the system. Furthermore the hydrochloric acid co-produced has a very low concentration of about 5 to 8% (by wt) and its concentration in a multiple effect evaporator is required in order to become a saleable product. Of course this additional concentration operation is a burden for the process which requires expensive energy. The goal of the inventors was to leave unchanged the general flowsheet of the plant, i.e. not to carry out the reaction between potassium chloride and nitric acid in an aqueous medium (as disclosed in our co-pending patent application) whereby the relatively concentrated aqueous solutions of hydrochloric acid are obtained directly. The general approach was to perform a selective extraction of the nitric acid present with the hydrochloric acid in the resulting brine, but to select these solvents in such a manner so that they would not interfere with the pentanols present in the reaction system. As realized, the solvents for the selective extraction will contact the brine solution already saturated with said pentanols, and accordingly the two solvents will mix up in a broad range. It was unexpectedly found that it was possible to maintain a certain range between the two solvents, so that the pentanol concentration in the solvent for the nitrate selective extraction could be maintained at the desired range. The present invention is based on this unexpected feature which can be achieved, by maintaining a controlled ratios of the phases with a different level of acidity in the batteries of stripping and washing of the solvent for the nitrate selective extraction. It was found that by maintaining the two solvents in the range of 1 part of selective solvent to 7 parts pentanol to 12 parts of selective solvent to 1 part pentanol, the extraction of the nitrate is even enhanced. In the following Table 1 are summarized some results on the extractability of nitric acid from an aqueous solution (containing 125 g/l HCl and 0.2 to 60 g/l $HNO_3$) by the selective extraction of nitric acid, at three different conditions:

1. When said selective solvent is used alone (without pentanol).
2. Mixture of said solvent with 16% of pentanol.
3. Another mixture of said solvent with 50% pentanol.

In all these experiments three levels of $HNO_3$ in the aqueous phase were utilized: 0.05–1 g/l; 15–25 g/l and 45–60 g/l.

In the above tests the selective solvent consisted of tributyl phospate (T.B.P.) at a constant concentration of 17% and kerosene was used as a diluent for the amyl alcohol and the selective solvent.

TABLE 1

| | | | Distribution coefficient | | | |
| | | | Aqueous phase containing $NO_3^-$ | | | Changes of |
| Exp. No. | AmOH % wt | Kerosene % wt | 0.05–1 g/l | 15–25 g/l | 45–60 g/l | HCl concentration g/l |
| --- | --- | --- | --- | --- | --- | --- |
| 1 | 0 | 83 | 2.8 | 0.8 | 0.4 | +1 |
| 2 | 16 | 67 | 2.6 | 0.9 | 0.6 | 0 |
| 3 | 50 | 33 | 2.5 | 1.2 | 0.9 | −12 |

From the above results it appears that when T.B.P. alone is utilized substantially no changes in the HCl concentration were encountered but a high phases ratio or an increased number of mixer-settlers will be required. When the T.B.P. is used with the amyl alcohol in accordance with the discovery of the present invention, no changes in the HCl concentration occurred and a lower phases ratio (organic to aqueous) or a lower number of mixer settlers will be required.

When T.B.P. is used with amyl alcohol, but in a ratio outside that discovered according to the present invention, a significant decrease of about 10% in the HCl concentration occurs. Moreover, difficulties were encountered in the phases separation, although the same phases ratio as in Experiment 2 was used.

Figure 4:
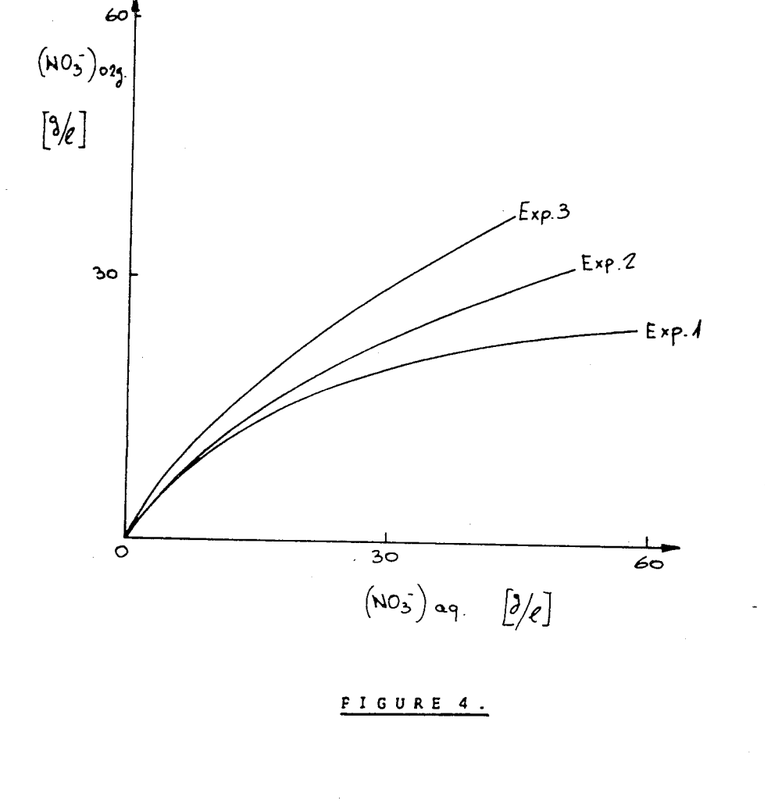

This appears in an illustrative manner in FIG. 4 which shows the equilibrium line of the HNO₃ resulted from the nitric acid present in the aqueous phase versus the organic phase. At the lower levels of nitric acid, no substantial changes in the behaviour of the above three cases can be observed. However, with an increase of nitric acid concentration an increase in the nitric acid extractability is encountered. Of course in Experiment 3 a higher nitric acid extractability occurs, but in this case the selectivity is reduced and as shown in the Table, a decrease of about 10% in the HCl concentration appears.

One of the advantages of the present invention is the fact that inexpensive plastic material such as ordinary polyvinyl chloride (P.V.C.) can be used as material of construction for the equipment. However, tributyl phosphate or ketones are known as plasticizers so that PVC would appear to be unsuitable and a higher expensive construction material would be required. It was discovered by the present inventors, that the incorporation of a pentanol or a butanol e.g. amyl alcohol in the range mentioned above, has a stabilizing effect on the PVC.

The organic solvents possessing a selective extraction of nitric acid from the aqueous solution containing the hydrochloric acid, being suitable for the system present in the potassium nitrate manufacture, i.e. maintaining the pentanol level in said organic solvent in the above mentioned narrow range, are selected from organic esters of phosphoric acid, preferably being the trialkyl phosphates, ketones having between five and ten carbon atoms and straight or cyclic polyethers, or polyalkylene glycols.

Among the trialkyl phosphates, the most preferred is tributyl phospate, which is completely immiscible in water so that no solvent recovery problems will be encountered. Tributyl phosphate is also commercially available, being largely used in the extraction of uranium. Other phosphorus-containing organic compounds, such as organic esters of phosphonic acid or phosphinic acid could in principle also be envisaged to be used as selective extractants from nitric acid, however these solvents are not so frequently encountered on the market their prices being higher than tributyl phosphate.

Ketones suitable for the present invention should of course be only slightly miscible in water, the preferably being those containing between five and ten carbon atoms.

Typical examples of such ketones are methyl isobutyl ketone, methyl cyclohexanone and methyl propyl ketone.

Straight or cyclic polyethers, having molecular weight in the range of 100 to 1000 are also useful in the system according to the present invention as selective extractants of nitric acid. Examples of such ethers are: Di-butyl ether, diethylene glycol di-butyl ether. Polyalkylene glycols suitable for the selective extraction of nitric acid should be slightly miscible in water and having molecular weight in the range of 1000 to 3000. Example of such compound is polypropylene glycol (M.W. 2000).

All these organic solvents possessing a selective extraction of nitric acid, are preferably used together with an organic diluent which assists their handling and phase separation. Generally most of the hydrocarbons, can be utilized as diluents for the organic solvents, the only requirement being not to extract hydrochloric acid in order not to affect the selective extraction of nitric acid from the aqueous solution containing it together with hydrochloric acid. Typical examples of such hydrocarbons are benzene, toluene, kerosene etc. The ratio between the organic diluent and the selective organic solvent may be selected from a broad range of 80:20 to 20:80 (by volumes).

The process according to the present invention is very simple to be carried out and overcomes the following main disadvantages of the known process as utilized at Haifa Chemicals plant:

(a) The hydrochloric acid co-produced, had a very low concentration in the range of 5–8% (by wt.).
(b) The hydrochloric acid co-produced (5–8% HCl) contained about 1 g/l of nitric acid which should be eliminated, compared to a substantially complete recovery of the nitric acid, the hydrochloric acid co-produced (13–15% HCl) containing less than 0.05 g/l nitric acid in the improved process.
(c) Problems in the extraction battery due to the solvent recirculation imposed to the system.
(d) The nitrate content in the hydrochloric acid should be eliminated by incorporating an extraneous reagent e.g. formalin, in excess over the stoichiometric required, said excess being mandatory to be removed in order not to incur undesirable reactions with the pentanol which means severe losses of pentanol. The general method for its removal is by distillation which means additional energy consumption.

The improved process according to the present invention is characterized by the following main advantages:

(a) Considerable savings of fuel, the hydrochloric acid co-produced being obtained in a relatively concentrated solution.
(b) No losses of nitric acid are encountered, substantially all nitrate values being recovered and recycled in the process.
(c) The improved process does not involve changes in the basic process according to the previous U.S. Pat. Nos. 2,902,341 and 2,894,813, an additional battery of liquid-liquid contactor for the nitric acid selective extraction, being required to the basic process flow sheet.
(d) High flexibility imparted to the system, due to elimination of solvent recirculation through the extraction battery, a fact which also assists the phase separation operation.

The general scheme of the process according to the present invention, as will be described below, consists of two independent cycles, each cycle using a different organic solvent. Pentanols are used as medium of the reaction between the potassium chloride and nitric acid and an organic solvent selected from organic esters of phosphoric acid, ketones having between 5 to 10 carbon atoms, and straight, cyclic polyethers, or polyalkylene glycols are utilized for a selective extraction or nitric acid. These two cycles are interconnected through the aqueous phase which flows from one cycle to the other. In this manner, the required step of hydrochloric acid stripping in the basic process is eliminated, which means less load on the liquid-liquid extraction contactor and smaller amounts of pentanol in the system. This operative feature is of great importance for the basic process, imparting a significant improvement in the phases separation.

Figure 1:
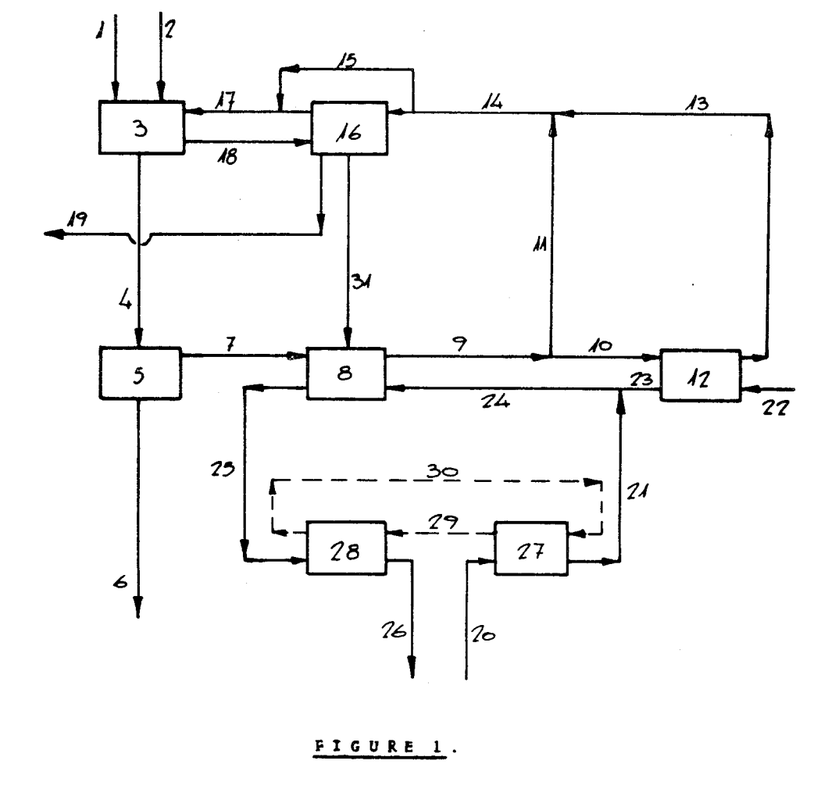
Figure 2:
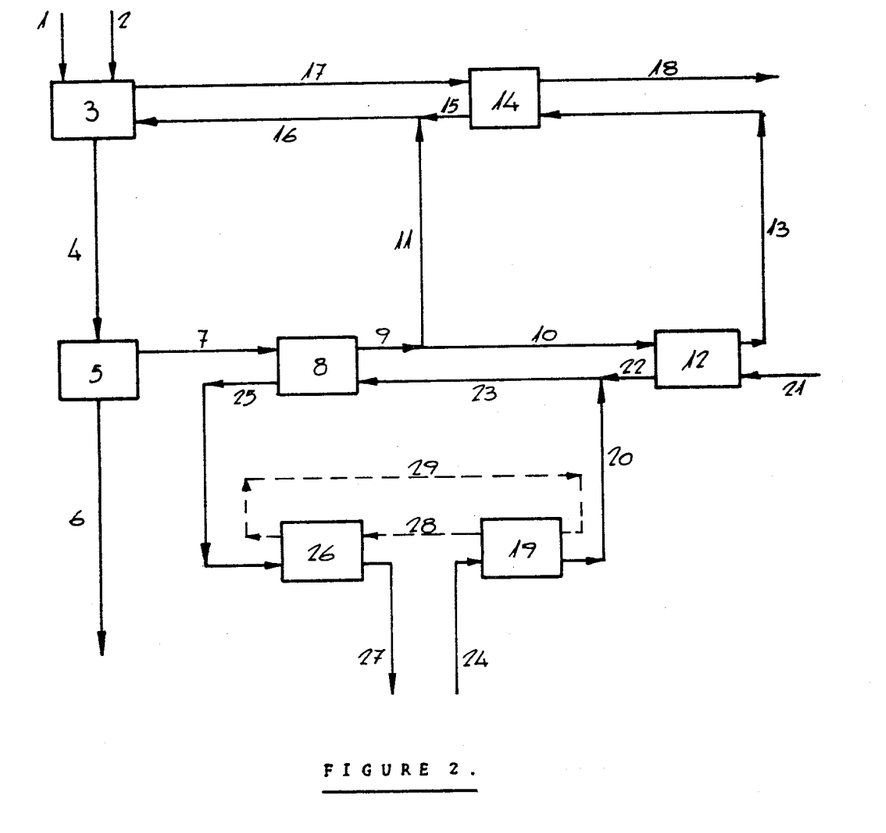
Figure 3:
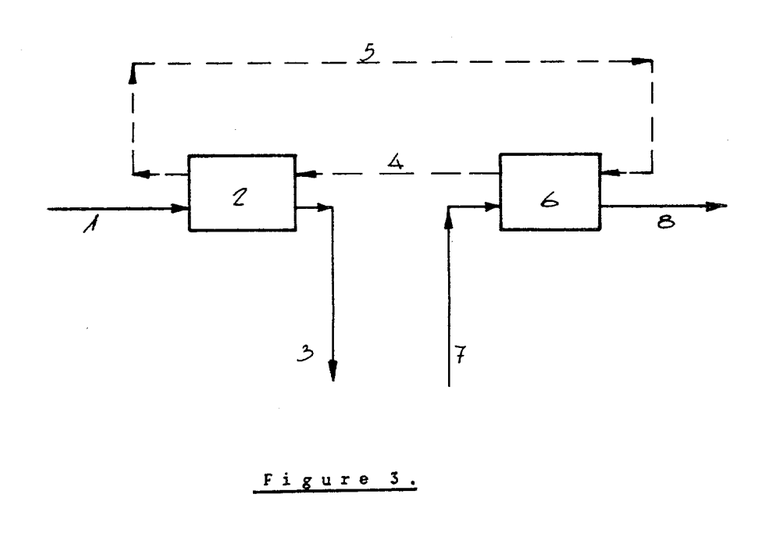

While the invention will now be described in connection with certain preferred embodiments as illustrated in FIGS. 1, 2 and 3, it will be understood that it is not intended to limit the invention to these particular embodiments. On the contrary it is intended to cover all alternatives, modifications and equivalents as may be included within the scope of the invention as defined by the appended claims. The examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention.

FIG. 1 represents in a schematic manner, a block diagram of a preferred embodiment of the present improved process. Nitric acid and potassium chloride are introduced into a cooled reaction vessel 3 through stream 1 and 2 respectively together with stream 17 of washed pentanol (e.g. amyl alcohol). The reaction products together with the unreacted reagents and the liquid phases (organic and aqueous) are conveyed through stream 4 into a decanter 5, from which wet crystals of potassium nitrate, with or without potassium chloride depending on the extent of conversion obtained, are separated through stream 6. The organic phase containing the hydrochloric acid and the nitric acid is conveyed through stream 7 into a multi-stage liquid-liquid contactor 8 wherein the hydrochloric acid is washed by an aqueous stream 24 and excess of brine coming through stream 31. The washed solvent stream 9 is divided in two separate streams, one 10 being fed to a liquid-liquid contactor 12 wherein it is washed by a stream of tap water 22, and the second stream 11 which together with stream 13, enters as stream 14 (after a prior cooling) into the second reaction vessel 16, wherein are also fed through stream 18 the excess of brine from the first reaction vessel 3 and the washed pentanol (amyl alcohol). By cooling the reaction vessel 16, crystals of potassium nitrate are obtained and removed through stream 19. The aqueous phase going out from the liquid-liquid contactor 8 through stream 25 which contains hydrochloric acid together with some nitric acid, is conveyed into a liquid-liquid contactor 28, wherein a selective extractant for the nitric acid is introduced through stream 29, resulting in a relatively concentrated solution of hydrochloric acid through stream 26 which is substantially free of nitric acid. The nitrate-loaded solvent extract going out from the liquid-liquid contactor 28, is conveyed through stream 30 into another liquid-liquid contactor 27 fed also with tap water 20, from which the washed solvent stream 29 is recycled to the battery 28. From this battery the aqueous solution containing the nitric acid is conveyed through stream 21 into the liquid-liquid contactor 8, together with the aqueous stream 23 going out from the liquid-liquid contactor 12 (the combined stream being mentioned in the block diagram as stream 24).

FIG. 2 represents in a schematic manner, a block diagram of another embodiment of the improved process according to the present invention, wherein only one stage of reaction is utilized. Nitric acid and potassium chloride are introduced into a cooled reaction vessel 3 through streams 1 and 2 together with stream 16 of washed pentanol (e.g. amyl alcohol). The reaction products together with the unreacted reagents and the liquid phases (organic and aqueous) are conveyed through stream 4 into a decanter 5, from which wet crystals of potassium nitrate with or without potassium chloride, depending on the extent of conversion obtained, are separated through stream 6. The organic phase from the decanter 5 is conveyed as stream 7 into a liquid-liquid contactor 8 wherein it is countercurrently washed by an aqueous stream 23. The washed solvent stream 9 is divided in two separate streams: one 10 entering into another liquid-liquid contactor 12 and being washed by a stream of tap water 21 and the second stream 11 being recycled into the reaction vessel 3 (in the unified stream 16 containing the loaded solvent extract 15 from the liquid-liquid contactor 14). The washed solvent stream 13 is conveyed into a liquid-liquid contactor 14 wherein it extracts the acids from the brine stream 17. The solvent-depleted brine is going out from the liquid-liquid contactor 14 as stream 18. The aqueous phase going out from the liquid-liquid contactor 8 through stream 25, which contains hydrochloric acid with some nitric acid, is conveyed into another liquid-liquid contactor 26, wherein the nitric acid is selectively extracted by a stream of washed selective solvent-stream 28. Relatively concentrated solution of hydrochloric acid substantially free of nitric acid is obtained as stream 27. The nitrate-loaded organic solvent extract stream 29 is washed in another liquid-liquid contactor 19, being washed by tap water, stream 24. The aqueous solution of nitric acid obtained in the battery 19 as stream 20, unified with the aqueous stream 22 from the liquid-liquid contactor 12, is introduced into the battery 8 as stream 23 for washing the loaded solvent stream 7 from the decanter 5.

FIG. 3 represents in a schematic manner, a block diagram describing only the selective extraction of the nitric acid from a stream containing hydrochloric acid. The hydrochloric acid solution containing also some nitric acid is conveyed through stream 1 into a liquid-liquid contactor 2. In the same battery enters a stream of washed selective organic solvent 4. A stream of relatively concentrated solution of hydrochloric acid substantially free of nitric acid is obtained as stream 3. The nitrate-loaded solvent extract stream 5 is fed into another liquid-liquid contactor 6 wherein it is washed by a stream of tap water 7 in resulting stream 8 consisting of aqueous solution of nitric acid which is recycled to the process.

The invention will be hereafter described by the following examples, it being understood that they are presented only for a better understanding of the invention. The concentrations are given in weight percentage, unless otherwise stated.

EXAMPLE 1 (see FIG. 1)

An amount of 1000 kg/h of commercially potassium chloride was fed together with 1350 kg/h of nitric acid (60%) (streams 1,2 respectively), and 13 m$^3$/h of washed amyl alcohol (stream 17). The temperature in the reactor was about 15° C. An amount of 1250 kg/h of crystals of potassium nitrate 99% purity was obtained from the decanter (stream 6). In the second reactor (16) kept at a temperature of about 0° C. an additional amount of 50 kg/h of potassium nitrate crystals precipitated, their purity being 99.8%. The hydrochloric acid-loaded solvent extract (stream 7) was washed in 12 units of mixers-settlers by the excess brine and diluted nitric acid (stream 24) and (stream 31), the ratios between the phases being 4 (org) to 1 (aq). The hydrochloric acid obtained in stream 25 contained about 15% HCl and 4%

HNO₃. It was contacted with a selective organic solvent solution which consisted of 25% tributyl phosphate and 25% amyl alcohol in kerosene, in 12 units of mixer-settlers, the ratio between the phases fed was 2 solvent to 1 aqueous hydrochloric acid. An amount of 3.0 m³/h of a solution of hydrochloric acid (15%) which contained only 0.05 g/l nitric acid was obtained as by-product in stream 26. The nitric acid-loaded solvent extract (stream 30) was washed by 2.2 m³/h of tap water (stream 20), the tributyl phosphate being recycled to the process.

EXAMPLE 2 (see FIG. 3)

The experiment as in Example 1 was repeated, but this time the selective extraction of the nitric acid was carried out by a polypropylene glycol (molecular weight 2000) 20%, and amyl alcohol 20% in toluene (60%). A stream of hydrochloric acid (13%) HCl containing 4% HNO₃ at the rate of 1 l/h (stream 1) entered into a 12 stages liquid-liquid contactor (2) wherein the nitric acid was extracted by stream 4 of the washed polypropylene glycol, the ratio between the phases being 1.8 organic solvent to 1 hydrochloric acid solution. Hydrochloric acid at a concentration of 12% containing only 0.08 g/l nitric acid (stream 3) at the rate of 11 l/h was obtained as byproduct. The nitric acid-loaded solvent extract (stream 5) was washed by 0.9 l/h of tap water (stream 7), the polypropylene glycol being recycled.

EXAMPLE 3 (see FIG. 1)

The removal of nitric acid from the excess of brine (stream 31) was carried out as in Example 1, the selective organic solvent for the nitric acid being in this case a mixture of 15% tributyl phosphate, 25% amyl alcohol and 60% kerosene. The ratio between the phases was 5:1 (solvent to aqueous), the extraction being carried out in 12 stages of mixers-settlers. The brine obtained contained less than 0.4 g/l nitric acid, and about 150 g/l of chloride ion.

EXAMPLE 4 (see FIG. 1)

The removal of nitric acid from the excess of brine (stream 31) was carried out as in Example 1, the selective organic solvent for the nitric acid being in this case a mixture of 80% methyl isobutyl ketone and 20% pentanol. The ratio between the phases was 2:1 (solvent to aqueous), the extraction being carried out in 12 stages of mixers-settlers. The hydrochloric acid obtained had a concentration of 13% and contained less than 0.1 g/l nitric acid.

EXAMPLE 5 (see FIG. 2)

An amount of 1000 kg/h of commercial potassium chloride was fed together with 1370 kg/h of nitric acid (60%) (streams 1,2 respectively), and 13 m³/h of cooled washed amyl alcohol (stream 16). The temperature in the reactor was about 15° C. An amount of 1300 kg of potassium nitrate (99% purity) was obtained in stream 6.

The hydrochloric acid-loaded solvent (stream 7) was washed in 12 stages of mixers-settlers by diluted nitric acid (stream 23). The ratio between the phases was 4:1 (organic to aqueous). The hydrochloric acid solution obtained in stream 25 contained about 13% HCl and 4% HNO₃ and was contacted in 12 stages of mixers-settlers with a selective organic solvent solution (stream 28) which consisted of 20% tributyl phospate, 20% amyl alcohol and 60% kerosene.

The ratio between the phases fed was 2 solvent to 1 aqueous hydrochloric acid, an amount of 3.5 m³/h of hydrochloric acid (13% by wt) which contained only 0.05 g/l nitric acid was obtained as by product in stream 27.

The nitric acid-loaded solvent extract (stream 29) was washed by 2.2 m³/h of tap water (stream 24).

While particular embodiments of this invention have been described, it will be evident to those skilled in the art that the present invention may be embodied in other specific forms without departing from the essential characteristics thereof.

We claim:

1. A process for the manufacture of potassium nitrate by reacting potassium chloride and nitric acid which comprises the performance of said reaction in the medium of an organic solvent selected from butanols and pentanols, the ratio between said reactants being in the range of 0.9 mole of HNO₃ per one mole of KCl up to 3 moles of HNO₃ to one mole of KCl, separating the potassium nitrate, while the liquid phase removed consists of an aqueous solution and organic solvent extract containing hydrochloric acid and nitric acid, washing the solvent extract in obtaining a hydrochloric acid containing nitric acid, the improvement consisting in that said solution of hydrochloric acid and nitric acid is contacted with an organic solvent selected from organic esters of phosphoric acid, ketones having five to ten carbon atoms and straight or cyclic polyethers having molecular weight in the range of 100 to 1000, and polyalkylene glycols slightly miscible in water and having molecular weight in the range of 1000 to 3000, or mixtures thereof, preferably in the presence of an organic diluent, whereby said organic solvent extracts selectively the nitric acid leaving a relatively concentrated aqueous solution of hydrochloric acid substantially nitrate-free.

2. A process for the manufacture of potassium nitrate according to claim 1, wherein the substantially nitric acid-free hydrochloric acid obtained as by-product in said process, has a concentration of about 14% by wt.

3. A process for the manufacture of potassium nitrate according to claim 1 or claim 2, wherein the selective organic solvent for nitric acid contains at least one of the solvents: tributyl phosphate, methyl isobutyl ketone, methyl cyclohexanone, methyl propyl ketone, polypropylene glycol (M.W. 2000), diethylene glycol dibutyl ether.

4. A process for the manufacture of potassium nitrate according to claim 1, wherein the organic diluent is benzene, toluene, kerosene or any other hydrocarbon which does not extract hydrochloric acid substantially.

5. A process for the manufacture of potassium nitrate according to claim 3, wherein in the selective extraction of nitric acid, the mixture of butanol or pentanol with the selective organic solvent is maintained in the range of 1 part of selective solvent to 7 parts butanol or pentanol to 12 parts of selective solvent to 1 part of butanol or pentanol.

6. A process for the manufacture of potassium nitrate according to claim 5, wherein said ratio between butanol or pentanol and selective organic solvent for nitric acid, prevails by controlling the flow of the streams in the batteries of stripping and washing of the selective organic solvent for the nitric acid, maintaining a different level of acidity.

7. A process for the manufacture of potassium nitrate according to claim 1, wherein the equipment used is made from polyvinyl chloride.

8. A process for the manufacture of potassium nitrate according to claim 7, wherein butanol or pentanol is present in the range of 1 part of selective solvent to 7 parts butanol or pentanol to 12 parts of selective solvent to 1 part of butanol or pentanol.

9. The process defined in claim 1, wherein said organic solvent loaded with $NO_3^-$ is washed and the recovered nitric acid and washed solvent is recycled to the process.

* * * * *